United States Patent Office 2,943,067
Patented June 28, 1960

2,943,067
CATALYSTS FOR CONVERSION OF HYDROCARBONS

Robert P. Sieg, Berkeley, Calif., assignor to California Research Corporation, San Francisco, Calif., a corporation of Delaware No Drawing. Filed June 28, 1957, Ser. No. 668,605

4 Claims. (Cl. 252—465)

This invention relates to the catalytic conversion of hydrocarbons by a cyclic, generally adiabatic process wherein the desired diolefin or other products are formed during an endothermic dehydrogenation or conversion step which is followed by an exothermic regeneration step wherein carbonaceous deposits formed on the catalyst surface during the conversion portion of the cycle are burned therefrom, thus furnishing the catalyst bed with the heat required in the succeeding conversion step. The invention is particularly directed to a novel catalyst which makes it possible to practice this operation at relatively high temperatures with improved selectivity and much longer total operating periods than has heretofore been possible.

This application is a continuation-in-part of co-pending application Serial No. 518,919, filed June 29, 1955, and now abandoned.

In carrying out a cyclic, adiabatic operation of the type to which this invention relates, it is desired that there be as high a per pass conversion as possible, commensurate with good dehydrogenation selectivity. That is to say, there should be produced maximum amounts of the desired products per given amount of feed converted. Other conditions remaining the same, an increase in average reaction temperatures normally results in higher per pass conversions. Further, in the case of butadiene, at least, an increase in temperature effects a shift towards butadiene of the butene/butadiene thermodynamic equilibrium. However, with the catalysts heretofore employed in commercial operations it has not been possible to take advantage of the benefits to be gained by operating at relatively high temperatures over the full life of the catalyst. Such catalysts, which are made up of chromium oxide deposited on an activated alumina of the Bayer Process type (i.e., one prepared by precipitation of the alumina from an alkaline aluminate solution such as an aqueous solution of sodium aluminate) have good total conversions and dehydrogenation selectivity values when relatively fresh. However, as they remain in service for several months, dehydrogenation selectivity falls off in an appreciable measure, as does the over-all per pass conversion. While higher conversion levels can be obtained with such less active catalysts by resort to higher temperatures, this leads to still more rapid deactivation and even poorer selectivity, as evidenced by a falling off in the relative amount of butadiene or other desired product and by an increase in the relative amount of coke laid down on the catalyst during the on-stream period. With increased coke lay-down, more heat is, in turn, released during succeeding regeneration portions of the operating cycle, thus giving rise to temperature run-away conditions, with consequent deactivation of the catalyst.

It is a general object of the present invention to provide a hydrocarbon conversion process of the cyclic, adiabatic type wherein the catalyst employed is capable of giving good performance from the conversion and selectivity standpoints over a relatively long operating period before catalyst replacement is required.

A particular object is to provide a cyclic, adiabatic process for the catalytic dehydrogenation of hydrocarbons, which process is characterized by long-sustained high total conversion and dehydrogenation selectivity levels. A still more particular object is to provide such a process which is well adapted to the production of butadiene and isoprene from the corresponding, more saturated hydrocarbons. Another object is to provide a novel and improved catalyst for use in reactions involving the dehydrogenation of hydrocarbons, particularly of $C_2$ to $C_5$ branched and/or straight chain hydrocarbons, or mixtures thereof.

The present invention is based on the discovery that the foregoing objects are attained by employing as the catalyst in the cyclic, adiabatic operation a particulate mass having a surface area less than about 100 m.$^2$/g. and which is comprised of alumina of so-called gel origin on which are deposited a total of from about 3 to 40% of one or more group VI metal oxides selected from the group consisting of chromium oxides and molybdenum oxides, together with a total of from about 0.025 to 3.0% of one or more alkali metal oxides selected from the group consisting of potassium oxide, lithium oxide and rubidium oxide. An alumina-chromia-potassium oxide catalyst is preferred. When used in dehydrogenation conversion reactions leading to the production of butadiene, the amount of alkali metal oxide in the catalyst is maintained below 0.5%, while the group VI metal oxide is preferably maintained in a range of from 5 to 25%.

The catalyst of the present invention can be employed in a wide variety of operations, including processes for the cracking, reforming dehydrogenation and isomerization of hydrocarbons. However, it is particularly well adapted for use in cyclic, adiabatic operations involving the dehydrogenation of aliphatic hydrocarbons containing from 2 to 5 carbon atoms in the molecule. Of such dehydrogenation reactions, those resulting in the production of butenes from n-butane, and more particularly of butadiene from n-butane and n-butenes, are presently of the greatest significance from the commercial standpoint. Accordingly, the invention will generally be described hereinafter as it relates to operations wherein butadiene is produced from a butane-rich feed stream, with additional information also being given as to the production of isoprene from isopentene.

Although the catalyst of the present invention can be prepared by various methods, a preferred method is to proceed by the following sequence of steps:

(1) The gel-type alumina support is impregnated with a predetermined amount of an aqueous solution of a potassium or other alkali metal salt, following which the resulting material is dried and calcined at temperatures above 1400° F. to effect a significant reduction in the surface area of the material, e.g., to a range of from about 80–150 m.$^2$/g.

(2) The calcined, alkali oxide-containing alumina is impregnated with an aqueous solution of a heat decomposable salt of chromium or molybdenum, following which the material is again dried and calcined at temperatures above 1300° F. to convert the salt to the oxide and to bring the final surface area of the catalyst into the desired range of between 30 and 100 M.$^2$/g.

The preferred preparatory method referred to above will now be described in greater detail. The gel-type alumina base can be prepared, for example, by precipitation from an acidic, aqueous solution of aluminum sulfate, nitrate or other salt, by the addition of ammonium hydroxide or other alkaline precipitating agent. The resulting hydrogel is thereafter washed and filtered to remove soluble, inorganic contaminants. The washed product is dried, preferably by spray drying methods to secure a finely divided powder. The powdered material is then slurried with a solution of a heat-decomposable salt of the alkali metal (preferably potassium carbonate, bicarbonate or hydroxide) or an alkali metal salt of an anion of the group VI metal, e.g., potassium chromate, in a concentration sufficient to yield a finished catalyst of desired alkali metal content. The resulting slurry is dried (e.g., six hours at 350° F.), mixed with graphite or other pelleting lubricant, and then pelleted. The pellets are then calcined at temperaures above about 1400° F. to convert the alkali compounds employed to the oxide form, to remove volatile impurities and water of hydration, and to decompose any lubricant employed. At the same time, the calcining treatment, which in many cases is conducted for from 3 to 7 hours at 1700–1800° F., for example, effects a substantial reduction in the surface area of the catalyst. This area is normally in excess of 200 m.$^2$/g. in the case of the gel-type alumina starting material, and is normally reduced to a value between about 80 to 150 m.$^2$/g. as a result of the calcining following the alkali metal impregnation step. As indicated, the time and temperature of this calcining operation may be varied within fairly wide limits with longer times being required at correspondingly lower temperatures. A minimum temperature consistent with reasonable calcining times is about 1400° F., while temperatures above about 1900–2000° F. should be avoided in so far as possible in order to prevent damage to the catalyst structure. If desired, steam may be substituted for dry air in calcining, the effect of steam being to reduce calcining temperatures and/or times. Thus, the same final area is attained for heat treatment for 26 hours at 1600° F. in dry air as in 4 hours at this same temperature in a steam atmosphere.

Instead of employing the foregoing procedure in which the alumina gel powder is slurried with an aqueous solution of alkali metal salt, the alkali metal compound can be introduced by blending the dry gel powder with a dry alkali metal salt. Alternatively, the gel-type alumina may be pelleted and precalcined until its surface area is brought approximately within the aforesaid 80–150 m.$^2$/g. range, with the calcined pellets then being impregnated with a solution of the alkali metal salt. In the latter method, no calcining step need be practiced following the alkali metal impregnation treatment unless it is desired to effect a further reduction in the surface area of the product prior to treating the same with the group VI metal compound. However, the first mentioned slurry method is preferred, since it results in a finished catalyst having greater activity and better selectivity than that prepared by dry mixing or by pellet impregnation.

In the event that more than the desired amount of alkali metal oxide is obtained in the catalyst, the excess may readily be leached out with hot water either before or after the steps of adding the group VI metal compound and calcining the product. In this connection it should be noted that substantially all of the potassium or other alkali metal employed can be removed by such leaching process, since it exists in the catalyst primarily in the form of soluble salts rather than insoluble, "Spinel-type" compounds formed in minor amounts by reaction of the alkali metal oxide with the alumina base when calcining temperatures above 1900–2000° F. are employed.

Proceeding to step 2 of the preferred preparatory method, the calcined alkali oxide-containing catalyst is then impregnated with an aqueous solution of the group VI metal component, preferably a chromium containing, heat decomposable compound such as chromic acid, chromic nitrate, ammonium dichromate or the like. The catalyst is then calcined to drive off volatile components and to decompose the chromium compound to the oxide, while also further reducing the surface area of the catalyst. Suitable calcining temperatures will range from about 1300 to about 1700° F., the lower limit being consistent with reasonable calcining times and the upper limit being set by reason of the tendency of the chromium oxide to sinter the catalyst at higher temperatures. In any case, the controlling factor is to obtain a finished catalyst having a surface area of about 30 to 100 m.$^2$/g., while for operations leading to the production of butadiene, the surface area should preferably be between about 50 and 80 m.$^2$/g. Such levels can be reached in many cases by calcining the catalyst at temperatures of from about 1600–1700° F. for periods of 4–6 hours, or even less, with somewhat longer periods being required at lower temperatures. The lower limit of 30 to 50 m.$^2$/g. is set so as to insure a catalyst having reasonably high activity, as evidenced by good conversion of the reactant feed, while the upper limit of 80–100 m.$^2$/g. is set since catalysts of higher surface area than this tend to produce disproportionately large amounts of coke and thus must be operated at temperatures so low as to be uneconomic from the yield and conversion standpoints, if temperature run-away is to be avoided. This is borne out by the data presented in Example II below, which show that in operations leading to the production of butadiene, it is highly advisable to employ a catalyst having an initial surface area below about 80 m$^2$./g. if the operation is to be conducted at efficient high temperature levels from the outset. Further, it has been found that catalysts having the defined, relatively low surface area retain desired performance characteristics for operating periods which are at least as long, and in some cases longer, than those which are brought on-stream at unduly high surface areas.

In referring herein to surface area, it is contemplated that the same be determined by conventional nitrogen adsorption methods.

The foregoing two-stage procedure for area reduction and metals impregnation of the alumina gel base is preferred to an alternate procedure using simultaneous metals impregnation and single-stage heat treatment, in that by the two-step procedure a major proportion of the required area reduction is secured in the absence of $Cr_2O_3$, thus resulting in a catalyst with sustained high activity and area stability.

It is considered that the nature of the present invention will be more fully understood by a consideration of the examples given below which illustrate the invention in various of its embodiments. However, before proceeding to the examples, various of the terms employed therein should be defined.

The term "butane conversion" is used in the examples to indicate pounds of butane destroyed (i.e., converted) per 100 pounds of feed passed through the catalyst in the reaction zone; in other words, the weight of butane in 100 pounds of feed, minus the weight of butane in the product from 100 pounds of feed. "Butene conversion" refers to the pounds of butene destroyed per 100 pounds of feed, it being assumed that all butane destroyed is first converted to butene, and that the latter is converted in part to butadiene, hydrogen, coke, and propene and lighter. Thus, butene conversion is pounds butene in 100 pounds feed plus butane converted per 100 pounds feed minus pounds butene in product from 100 pounds feed. "Total conversion" is the sum of the respective butane and butene conversion figures. The term "dehydrogenation selectivity," as employed herein, is a function of the ultimate, calculated yield of butadiene, and assumes that butene in the product (over and above that recycled to the conversion zone) can be converted to butadiene in a separate dehydrogenation process in a yield of 68.6%. Specifically:

Dehydrogenation selectivity = 100

$$\times \frac{\begin{array}{c}(\text{Wt. of butadiene in product from 100 pounds} \\ \text{feed} - \text{wt. of butadiene in 100 pounds feed}) + \\ 0.686 \,(\text{wt. of butene in product from 100 pounds} \\ \text{feed} - \text{wt. of butene in 100 pounds feed})\end{array}}{\text{Butane conversion}}$$

The numerator of the fraction in the above equation is defined as the "butadiene equivalent yield."

EXAMPLE 1

This example is presented to show a comparison between the activity levels of a Bayer Process alumina catalyst and of gel-type alumina-supported catalysts containing various amounts of alkali metal component. All catalysts contained $Cr_2O_3$ in quantities as indicated in Table I below. The catalyst used in runs 2663, 2665 and 2675 was a commercial butadiene catalyst of the Bayer type (Harshaw Chemical Company), while the remaining catalysts shown in the table were prepared from a gel-type alumina catalyst (Filtrol Alumina No. 90, a product of the Filtrol Corporation), by the two-stage, slurry method described above. Results are given both as to fresh catalyst, as well as that given an accelerated aging treatment at 1600° F. to simulate commercial usage. In this connection, it has been found that treatment of the finished catalyst at 1600° F. for periods of 4, 24 and 64 hours has approximately the same effect on the catalyst (as determined by surface area and by overall performance characteristics) as does actual plant usage for periods of 3, 6 and 9 months, respectively.

The dehydrogenation runs shown in Table I were conducted in a pilot, adiabatic unit with semi-automatic control in order to reproduce commercial operating conditions. The feed employed was 98% butane. The unit is operated on a 30 minute cycle: 10 minutes hydrocarbon feed at 1.45 v./v./hr., 6 inches of Hg absolute pressure and the indicated inlet temperature; 10 minutes air feed at about atmospheric pressure (and at the same inlet temperature as used for the hydrocarbon feed) to burn off carbon deposits and effect some leveling of bed temperatures; and 10 minutes intermediate time for purging with nitrogen and for evacuation between the "make" and regeneration steps of the cycle.

In this type of reactor system, the catalyst bed must always operate in a condition of over-all zero net heat; that is, the endothermic reaction heat of dehydrogenation, exothermic regeneration heat of coke combustion, and other sources of heat input or removal, such as sensible heat of feed and air, must total zero in order to continually reproduce the same reactor temperatures and conversions cycle after cycle. Since reaction and coke production do not necessarily occur in exactly the same ratio in all portions of the catalyst bed, some portions will tend to be in negative heat and somewhat cool, while other portions will tend to be in positive net heat and local temperatures will rise until, for any given temperature of the feed and regeneration gases, a steady state temperature profile is attained in which the negative net heat portions are heated with feed and air to compensate for that heat deficiency, while the positive net heat portions are cooled by feed and air to compensate for the heat excess. As feed and regeneration inlet temperatures are thereafter gradually increased to attain maximum conversion for given feed rate and hydrocarbon feed composition, a point will ultimately be reached at which run-away temperature condition will obtain near the outlet of the reactor, and the system will be no longer

Table I

| Catalyst Type | Commercial Bayer | | | Precipitated Gel | | | | | | |
|---|---|---|---|---|---|---|---|---|---|---|
| Run No | 2663 | 2665 | 2675 | 2761 | 2771 | 2694 | 2713 | 2760 | 2770 | 2706 |
| Composition: | | | | | | | | | | |
| $K_2O$, Wt., Percent | 0 | 0 | 0 | 0 | 0 | 0.04 | 0.04 | 0.10 | 0.10 | 0.16 |
| $Cr_2O_3$, Wt., Percent | 18.6 | 18.6 | 18.6 | 21.25 | 21.25 | 17.27 | 17.27 | 19.6 | 19.6 | 16.57 |
| Added Heat Treatment at 1,600° F., Hrs | | 4 | 28 | | 26 | | 26 | | 26 | |
| Temperature, °F | | 1600 | 1600 | | 1600 | | 1600 | | 1600 | |
| Surface Area, m.²/g | 60 | 37 | 19 | 67.3 | 32.5 | 64 | 54.6 | 66.4 | 40.9 | 78.1 |
| Max. Inlet Temp., °F | 1,100 | 1,125 | 1,140 | 1,035 | 1,080 | 1,075 | 1,175 | 1,100 | 1,130 | 1,105 |
| Product Analysis, Wt. Percent: | | | | | | | | | | |
| Coke | 1.6 | 1.4 | 1.1 | 1.7 | 1.4 | 2.5 | 2.5 | 1.6 | 1.5 | 2.5 |
| Hydrogen | 2.2 | 2.0 | 1.4 | 1.0 | 1.0 | 2.4 | 2.2 | 2.2 | 1.2 | 2.3 |
| $C_3^-$ plus $C_5^+$ | 7.5 | 6.0 | 6.8 | 2.5 | 2.9 | 4.7 | 5.3 | 3.2 | 4.9 | 5.4 |
| Butadiene | 8.0 | 7.2 | 4.4 | 5.2 | 6.3 | 6.7 | 8.0 | 6.9 | 9.6 | 6.6 |
| Butenes | 31.2 | 24.8 | 11.5 | 24.1 | 23.6 | 28.1 | 25.1 | 27.6 | 25.0 | 27.7 |
| Butane | 51.0 | 58.4 | 74.8 | 65.5 | 64.5 | 55.5 | 57.0 | 59.6 | 57.8 | 55.5 |
| Butane Conversion, Percent | 47.0 | 39.6 | 23.2 | 32.5 | 33.5 | 42.5 | 41.0 | 38.4 | 40.2 | 42.5 |
| Butene Conversion, Percent | 15.8 | 14.8 | 11.7 | 8.4 | 9.9 | 14.4 | 15.9 | 10.8 | 15.2 | 14.8 |
| Total Conversion, Percent | 62.8 | 54.4 | 34.9 | 40.9 | 43.4 | 56.9 | 56.9 | 49.2 | 55.4 | 57.3 |
| Butadiene Equivalent Yield | 29.4 | 24.2 | 12.3 | 21.7 | 22.5 | 26.0 | 25.2 | 25.8 | 26.8 | 25.6 |
| Selectivity | 62.6 | 61.1 | 53.0 | 66.9 | 67.1 | 61.2 | 61.5 | 67.3 | 66.5 | 60.2 |
| Coke/Dehydrogenation Ratio [1] | 3.4 | 3.6 | 5.4 | 4.9 | 3.9 | 6.0 | 6.1 | 3.9 | 3.4 | 6.1 |

| Catalyst Type | Precipitated Gel | | | | | | | | |
|---|---|---|---|---|---|---|---|---|---|
| Run No | 2717 | 2721 | 2737 | 2715 | 2735 | 2716 | 2723 | CRL-128 | CRL-128 |
| Composition: | | | | | | | | | |
| $K_2O$, Wt. Percent | 0.16 | 0.24 | 0.24 | 0.35 | 0.35 | 0.70 | 0.70 | 1.7 | 1.7 |
| $Cr_2O_3$, Wt. Percent | 16.57 | 18.51 | 18.51 | 20.29 | 20.29 | 21.29 | 21.29 | 17.5 | 17.5 |
| Added Heat Treatment at 1,600° F., Hrs | 26 | | 26 | | 24 | | 24 | | 26 |
| Temperature, °F | 1600 | | 1600 | | 1600 | | 1600 | | 1,600 |
| Surface Area, m.²/g | 41.0 | 67.0 | 42.3 | 48.9 | 35.2 | 61.5 | 46.8 | 70.3 | 55.3 |
| Max. Inlet Temp., °F | 1,145 | 1,120 | 1,145 | 1,150 | 1,145 | 1,085 | 1,070 | 980 | 1,015 |
| Product Analysis, Wt. Percent: | | | | | | | | | |
| Coke | 1.7 | 1.9 | 1.7 | 2.3 | 2.2 | 1.2 | 2.4 | 0.6 | |
| Hydrogen | 2.4 | 2.5 | 1.4 | 2.5 | 1.0 | 1.6 | 1.6 | 0.1 | |
| $C_3^-$ plus $C_5^+$ | 5.3 | 4.5 | 5.2 | 6.5 | 5.2 | 3.6 | 4.6 | 3.1 | |
| Butadiene | 9.9 | 7.8 | 9.2 | 9.8 | 7.6 | 5.1 | 5.2 | 1.1 | |
| Butenes | 24.2 | 26.4 | 22.4 | 21.3 | 14.7 | 17.2 | 11.3 | 1.7 | |
| Butane | 56.4 | 56.8 | 60.0 | 57.7 | 69.2 | 71.2 | 74.9 | 93.3 | |
| Butane Conversion, Percent | 41.6 | 41.2 | 38.0 | 40.3 | 28.8 | 26.8 | 23.1 | 4.7 | |
| Butene Conversion, Percent | 17.4 | 14.8 | 15.6 | 19.0 | 14.1 | 9.6 | 11.8 | 3.0 | |
| Total Conversion, Percent | 59.0 | 56.0 | 53.6 | 59.3 | 42.9 | 36.4 | 34.9 | 7.7 | |
| Butadiene Equivalent Yield | 26.5 | 25.9 | 24.6 | 24.4 | 17.7 | 16.9 | 13.0 | 2.3 | |
| Selectivity | 63.7 | 62.9 | 64.7 | 60.6 | 61.4 | 63.1 | 56.1 | 48.9 | |
| Coke/Dehydrogenation Ratio [1] | 3.9 | 4.5 | 4.2 | 5.6 | 7.3 | 4.4 | 11.2 | 15.3 | |

[1] $\dfrac{\text{Wt. Coke} \times 100}{2(\text{Wt. Butadiene}) + \text{wt. butene}}$ under control. In Table I the indicated inlet temperatures are approximately the maximum temperatures which can be employed, they having been determined by raising the inlet temperature gradually to a point where the system, while still under good control, was nevertheless close to incipient temperature run-away. Thus, the indicated conversions and other yield factors given in the table represent a practical maximum for the catalyst under study in each run.

Reference to the data presented in the foregoing table shows that those catalysts provided with less than 0.5% K₂O gave high total conversions and had good selectivity even after sustained heat treatment equivalent to over six months of plant usage. The Bayer-type catalyst had good operating characteristics when fresh, but fell off in activity after only four hours' treatment at 1600 F., equivalent to three months' plant service. Poor results were obtained with the gel-type catalyst which contained no K₂O.

It is also obvious from the data that catalysts containing more than 0.5% K₂O show a decided tendency towards instability as evidenced by a high coke/dehydrogenation ratio which necessitates the employment of low inlet temperatures to avoid temperature run-away. Thus, while alkali metal contents as high as 3% are beneficial in some conversion operations wherein the present catalyst finds utility, this is not the case in cyclic, adiabatic operations for dehydrogenating butane and butenes to butadiene.

EXAMPLE 2

The runs presented in Table II below were made under the same conditions, and with the same equipment as those of Example 1. This example illustrates the effect of initial surface area, and shows that catalysts having surface areas above about 80 m.²/g. have much lower maximum permissible inlet temperatures than those of lower surface area. The difference becomes even more striking with those catalysts having surfaces areas of approximately 100 m.²/g., or more.

*Table II*

| Catalyst Type | Precipitated Alumina Gel | | | | | | | |
|---|---|---|---|---|---|---|---|---|
| Run No | | | | 2706 | 2717 | | 2721 | 2737 |
| Composition, Wt. Percent: | | | | | | | | |
| K₂O | 0.10 | 0.10 | 0.10 | 0.16 | 0.16 | 0.24 | 0.24 | 0.24 |
| Cr₂O₃ | 21.19 | 21.19 | 21.19 | 16.6 | 16.6 | 18.51 | 18.51 | 18.51 |
| Surface Area, sq. Meter/Gram | 124 | 82 | 51 | 78 | 41 | 89 | 67 | 42 |
| Max. Inlet Temp., °F | 1,000 | 1,100 | 1,135 | 1,105 | 1,130 | 1,015 | 1,120 | 1,145 |
| Product Analysis, Wt. Percent: | | | | | | | | |
| Coke | 2.3 | 2.0 | 2.7 | 2.5 | 2.0 | 2.1 | 1.9 | 1.7 |
| Hydrogen | 1.8 | 2.5 | 1.0 | 2.3 | 3.0 | 1.9 | 2.5 | 1.4 |
| C₃⁻ Plus C₅⁺ | 3.3 | 4.5 | 5.0 | 5.4 | 5.5 | 2.9 | 4.5 | 5.2 |
| Butadiene | 3.3 | 8.1 | 9.6 | 6.6 | 8.9 | 5.3 | 7.8 | 9.2 |
| Butenes | 23.8 | 26.8 | 2.8 | 27.7 | 20.7 | 25.1 | 26.4 | 22.4 |
| Butane | 65.2 | 56.2 | 58.9 | 55.5 | 60.2 | 62.6 | 56.8 | 60.0 |
| Butadiene Equivalent Yield | 19.6 | 26.5 | 25.2 | 25.6 | 23.1 | 22.5 | 25.9 | 24.6 |
| Selectivity | 59.8 | 63.4 | 64.6 | 60.2 | 61.1 | 63.6 | 62.9 | 64.7 |
| Total Conversion | 41.8 | 56.8 | 55.4 | 57.3 | 54.9 | 45.7 | 56.0 | 53.6 |

EXAMPLE 3

Table III illustrates the stability of the potassium-containing alumina gel type catalysts under severe heat treatment. These runs were conducted under the same conditions, and with the same equipment, as described in Example 1. It will be noted that gel-type catalyst has better selectivity (coupled with high conversion) after 8.3 months' equivalent commercial service than fresh Bayer-type catalyst, and is also better after 9.3 months' service than the Bayer-type alumina catalyst after 6.4 months' service.

*Table III*

| Catalyst Type | Bayer Type | | Precipitated Gel | | |
|---|---|---|---|---|---|
| Run No | 2663 | 2675 | 2706 | 2809 | 2806 |
| Composition, Wt. Percent: | | | | | |
| K₂O | 0 | 0 | 0.16 | 0.14 | 0.17 |
| Cr₂O₃ | 18.6 | 18.6 | 16.57 | 15.7 | 16.6 |
| Accelerated Aging Treatment, Hrs | Fresh | 28 | Fresh | 52 | 66 |
| Temperature, °F | | 1,600 | | 1,600 | 1,600 |
| Months Equiv. Plant Service | 0 | 6.4 | 0 | 8.3 | 9.3 |
| Surface Area, m.²/g | 60 | 37 | 78.1 | 42 | 32.7 |
| Max. Inlet Temp., °F | 1,100 | 1,140 | 1,105 | 1,140 | 1,150 |
| Product Analysis, Wt. Percent: | | | | | |
| Coke | 1.6 | 1.1 | 2.5 | 1.9 | 2.2 |
| Hydrogen | 2.2 | 1.4 | 2.3 | 1.4 | 1.1 |
| C₃⁻ Plus C₅⁺ | 7.5 | 6.8 | 5.4 | 5.9 | 5.5 |
| Butadiene | 8.0 | 4.4 | 6.6 | 9.0 | 8.8 |
| Butenes | 31.2 | 11.5 | 27.7 | 22.6 | 14.4 |
| Butane | 51.0 | 74.8 | 55.5 | 57.2 | 66.0 |
| Butane Conversion, Percent | 47.0 | 23.2 | 42.5 | 40.8 | 32.0 |
| Butene Conversion, Percent | 15.8 | 11.7 | 14.8 | 18.2 | 17.6 |
| Total Conversion, Percent | 62.8 | 34.9 | 57.3 | 59.0 | 49.6 |
| Butadiene Equivalent Yield | 29.4 | 12.3 | 25.6 | 24.5 | 18.7 |
| Selectivity | 62.6 | 53.0 | 60.2 | 67.0 | 59.0 |
| Coke/Dehydrogenation Ratio | 3.4 | 5.4 | 6.1 | 4.7 | 6.9 |

EXAMPLE 4

A series of isothermal (as distinguished from adiabatic) runs was made with catalysts prepared with various alkali metals to obtain the comparative activity thereof at a fixed temperature level, both as freshly prepared and after a synthetic aging treatment for four hours at 1600° F., equivalent to three months' service in a commercial dehydrogenation plant. While the amounts of alkali metals used in these runs exceeded 0.5%, it is believed that the data presented are valid in a comparative sense, it being noted that these were isothermal runs where the temperature of the catalyst bed was closely controlled by external means. The catalyst used for run No. S-601 was prepared by impregnating pelleted Bayer Process activated alumina with an amount of chromic acid sufficient to supply the catalyst when dry with 17% by weight chromium oxide, following which the catalyst was dried and then calcined at 1150° F. for five hours. The catalyst used for run No. S-602 was the same as that employed in run No. S-601, except that 2 weight percent of $K_2O$ was added by impregnation in addition to the 17% $Cr_2O_3$ and the catalyst then calcined at 1150° F. for five hours. The catalyst of run No. S-421 was a gel-type alumina base material (Filtrol No. 90) pelleted in the same fashion as the Bayer Process material and prepared in the same fashion as catalyst No. S-601, except for a heat treatment at 1600° F. before impregnation with chromic acid. The catalysts used for runs No. S-491, S-603, S-604, and S-605 were prepared from the gel-type base material the same as that for No. S-421 and with the same processing steps, except for the introduction of the indicated amounts of alkali metal oxide added by impregnation along with the chromic oxide. The catalysts described above were tested under the following feed and isothermal processing conditions: feed, 100% butane; feed rate, 1.2 v./v./hr.; average catalyst temperature, 1100° F.; pressure, 5 inches Hg absolute; time on-stream, 15 minutes. The data obtained in these runs are presented in Table IV, following.

production of a highly inferior catalyst having a low yield of dehydrogenation products and poor dehydrogenation selectivity.

A comparison of the catalyst used in runs No. S-491 and No. S-421 clearly shows the benefits gained by the addition of potassium oxide to the gel-type alumina-based catalyst, for example, in lowering the amount of coke and $C_3$ and $C_5^+$ cracked products while increasing the yield of dehydrogenated products and improving the dehydrogenating selectivity.

In comparing the catalysts used for runs No. S-491, No. S-603, No. S-604 and No. S-605, it is seen that the addition of sodium oxide to the catalyst (run No. S-603) results in the production of a catalyst having high coking characteristics, a low yield of dehydrogenation products and poor selectivity as compared with the other alkali promoted catalysts, particularly catalyst No. S-491 containing potassium oxide. The table shows also the addition of sodium oxide results in a catalyst having poorer characteristics than the catalyst containing only the gel-type alumina and chromium oxide after the aging treatment. The addition of lithium oxide and rubidium oxide is seen to result in improved coking characteristics and selectivity over the nonalkali promoted catalyst, especially when the catalyst is fresh, though the improvement is not as great as when potassium oxide is the additive employed.

EXAMPLE 5

This example is presented to illustrate the effect of low chromic content of the catalyst on activity and relative surface area. Table V shows results obtained in adiabatic runs conducted under conditions, and with equipment similar to the runs of Example 1, the catalyst being the alumina gel type, and containing 0.16% $K_2O$ and 6.7% $Cr_2O_3$. The catalyst indicated in the tables as "fresh"

Table IV

| Catalyst Type | Commercial Bayer | | | | Precipitated Gel | | | | | | | | | |
|---|---|---|---|---|---|---|---|---|---|---|---|---|---|---|
| Run No. | S-601 | | S-602 | | S-421 | | S-491 | | S-603 | | S-604 | | S-605 | |
| Composition: | | | | | | | | | | | | | | |
| Alkali Metal | --- | | $K_2O$ | | --- | | $K_2O$ | | $Na_2O$ | | $Li_2O$ | | $Rb_2O$ | |
| Alkali Metal, Wt. percent | 0 | | 2.0 | | 0 | | 2.0 | | 1.8 | | 1.5 | | 1.8 | |
| $Cr_2O_3$, Wt. percent | 17.0 | | 17.6 | | 16.5 | | 16.4 | | 16.3 | | 14.0 | | 16.4 | |
| Accelerated Aging Treatment—Hours | fresh | 4 | fresh | 4 | fresh | 4 | fresh | 4 | fresh | 4 | fresh | 4 | fresh | 4 |
| Temperature, °F | | 1,600 | | 1,600 | | 1,600 | | 1,600 | | 1,600 | | 1,600 | | 1,600 |
| Surface Area, Square Meters/gram | 63 | 31 | 63 | 24 | 131 | 99 | 124 | 95 | 99 | 78 | 98 | 76 | 96 | 83 |
| Product Analysis, Wt. percent: | | | | | | | | | | | | | | |
| Coke | 2.6 | 9.6 | 8.0 | 1.8 | 9.7 | 4.8 | 5.3 | 4.5 | 6.7 | 5.6 | 4.0 | 2.4 | 4.7 | 4.1 |
| Hydrogen | 3.6 | 2.5 | 5.0 | 1.7 | 5.5 | 3.9 | 5.9 | 5.7 | 5.3 | 4.3 | 3.2 | 3.0 | 3.9 | 4.1 |
| $C_3^-$ plus $C_5^+$ | 9.4 | 11.9 | 13.0 | 7.8 | 14.1 | 8.5 | 12.0 | 11.9 | 16.0 | 11.6 | 8.2 | 7.1 | 12.6 | 12.5 |
| Butadiene | 11.0 | 5.1 | 5.9 | 1.4 | 7.0 | 7.3 | 14.0 | 13.5 | 8.5 | 6.6 | 10.2 | 9.0 | 10.2 | 9.8 |
| Butenes | 31.2 | 12.4 | 17.6 | 3.3 | 29.9 | 24.3 | 30.2 | 27.3 | 25.9 | 14.8 | 24.7 | 23.9 | 25.7 | 22.3 |
| Butane | 42.4 | 67.5 | 50.5 | 84.0 | 33.8 | 51.2 | 32.6 | 37.1 | 37.6 | 57.1 | 49.7 | 54.6 | 42.9 | 47.2 |
| Butane Conversion, percent | 57.8 | 32.5 | 49.5 | 16.0 | 66.2 | 48.8 | 67.4 | 62.9 | 62.4 | 42.9 | 50.3 | 45.4 | 57.1 | 52.8 |
| Butene Conversion | 26.6 | 20.1 | 31.9 | 12.7 | 36.3 | 24.5 | 37.2 | 35.6 | 36.5 | 28.1 | 25.6 | 21.5 | 31.4 | 30.5 |
| Total Conversion | 84.4 | 52.6 | 81.4 | 28.7 | 102.5 | 73.3 | 104.6 | 98.5 | 98.9 | 71.0 | 75.9 | 66.9 | 88.5 | 83.3 |
| Butadiene Equivalent Yield | 32.4 | 13.6 | 18.0 | 3.7 | 27.5 | 24.0 | 34.7 | 32.2 | 26.3 | 16.7 | 27.1 | 25.4 | 27.8 | 25.1 |
| Selectivity | 56.0 | 41.8 | 36.4 | 23.1 | 41.6 | 49.1 | 51.5 | 51.2 | 42.1 | 38.9 | 13.8 | 55.9 | 48.7 | 47.5 |

As seen from the foregoing table, the two Bayer Process alumina-based catalysts (runs No. S-601 and No. S-602) have much poorer thermal stability than gel-type alumina-based catalysts of the other runs. This is evidenced by the relatively large decline in total conversion and dehydrogenation selectivity which occurs after heat treatment for four hours at 1600° F. Further, the addition of potassium oxide to the Bayer Process base catalyst caused particularly large losses in stability and resulted in the was calcined for 4 hours at 1400° F. after chromic acid impregnation. It will be noted in Table V from the catalyst areas after accelerated aging and by comparison with similar data in Table III, that with catalysts of relatively low chromia content, there is little loss of surface area with age. Likewise, catalyst activity, as shown by conversions and yields, improved with aging. Table V further illustrates the deleterious effect of surface areas exceeding 100 m.²/g., as evidenced by the decrease in maximum permissible inlet temperature and the attendant decrease in yields and conversions.

Table V

| Catalyst Type | Precipitated Gel | | | | |
|---|---|---|---|---|---|
| Run No | 2786 | 2789 | 2793 | | |
| Composition, Wt. Percent: | | | | | |
| $K_2O$ | 0.16 | 0.16 | 0.16 | 0.16 | 0.16 |
| $Cr_2O_3$ | 6.7 | 6.7 | 6.7 | 6.7 | 6.7 |
| Added Heat Treatment, Hrs. at 1,900° F | Fresh | 6 | 26 | 46 | 66 |
| Months Equiv. Plant Service | 0 | 3.6 | 6.2 | 7.8 | 9.3 |
| Surface Area, m.³/g | 105.8 | 98.1 | 89.8 | 84.5 | 82.0 |
| Max. Inlet Temp., °F | 980 | 1,065 | 1,075 | | |
| Product Analysis, Wt. Percent: | | | | | |
| Coke | 1.5 | 0.8 | 2.5 | Not tested. | |
| Hydrogen | 1.7 | 1.2 | 1.2 | Do. | |
| $C_3$- Plus $C_5$+ | 2.8 | 5.3 | 4.9 | Do. | |
| Butadiene | 4.2 | 6.0 | 6.6 | Do. | |
| Butenes | 24.6 | 26.5 | 29.8 | Do. | |
| Butane | 64.9 | 59.8 | 55.0 | Do. | |
| Butane Conversion, Percent | 33.1 | 38.2 | 43.0 | Do. | |
| Butene Conversion, Percent | 8.5 | 11.7 | 13.2 | Do. | |
| Total Conversion, Percent | 41.6 | 49.9 | 56.2 | Do. | |
| Butadiene Equivalent Yield | 21.1 | 24.2 | 27.0 | Do. | |
| Selectivity | 63.7 | 63.3 | 62.8 | Do. | |

EXAMPLE 6

Table VI deals with adiabatic runs conducted under conditions generally similar to those of Example 1, illustrating the utility of the alumina gel type catalysts for production of isoprene from isopentane. The feed contained 98% isopentane and 2% normal pentane. The yield and conversion definitions are completely analogous to those set forth for butane dehydrogenation herein above.

Table VI

| Catalyst Type | Bayer Alumina | Precipitated Alumina Gel |
|---|---|---|
| Run No | 2751 | 2752 |
| Composition, Wt. Percent: | | |
| $K_2O$ | | 0.16 |
| $Cr_2O_3$ | 18.0 | 16.6 |
| Space Rate, v./v./hr | 2.0 | 1.0 |
| Surface Area, m.²/g | 60 | 41 |
| Max. Inlet Temp., °F | 1,066 | 1,086 |
| Isopentane Conversion, Percent | 45.4 | 45.4 |
| Pentane Conversion, Percent | 18.6 | 25.2 |
| Total Conversion, Percent | 64.0 | 70.6 |
| Isoprene Yield | 8.4 | 12.7 |
| Selectivity, Percent | 18.5 | 28.0 |

In conducting the dehydrogenation reactions embraced by the present invention, it is desirable that hydrogen and product hydrocarbons be present in the reaction mix only at relatively low partial pressures. This is particularly true when producing butadiene from butane and isoprene from isopentane, where two successive dehydrogenation steps are involved, each involving an increase in volume and partial pressure relative to the feed hydrocarbons. A further reason arises from the fact that as the partial pressure of the dehydrogenated materials increases, polymerization of these olefins and undue formation of coke results. Low partial pressure may be secured either by operating during the hydrocarbon feed portion of the cycle under a partial vacuum, i.e., at reduced total pressure, or by use of a diluent gas such as nitrogen or methane which does not take part in the reaction. It is preferred, therefore, to operate either at total pressures between about 5 and 20 inches Hg absolute; or, if dilution with inert gas is employed, at hydrogen partial pressures in the reaction mix of between 1.0 and 10.0 inches of Hg absolute.

The various percentages employed herein are on a weight basis, unless otherwise indicated.

While the invention has been illustrated in terms of a catalyst having the shape of small pellets, other shapes may also be used, e.g., granules, spheres or even fine particles of the type used in fluid operations.

I claim:

1. A dehydrogenation catalyst for the catalytic dehydrogenation of more saturated $C_4$ hydrocarbons to butadiene, which comprises an alumina prepared by precipitation from a solution of an aluminum salt by addition of an alkaline precipitating agent and, supported on said alumina, a total of from about 0.025 to 0.5% by weight of at least one water-soluble oxide selected from the group consisting of potassium, lithium and rubidium oxides, and a total of from about 3 to 40% by weight of at least one oxide selected from the group consisting of chromium and molybdenum oxides, said catalyst having a surface area between about 30 and 100 m.²/g.

2. A dehydrogenation catalyst for the catalytic dehydrogenation of more saturated $C_4$ hydrocarbons to butadiene, which comprises an alumina prepared by precipitation from a solution of an aluminum salt by addition of an alkaline precipitating agent and, supported on said alumina, from about 0.025% to 0.5% by weight of water-soluble potassium oxide and from about 5 to 25% by weight of chromium oxide, said catalyst having a surface area between about 30 and 100 m.²/g.

3. A method of catalyst preparation which comprises impregnating an alumina of gel type origin, as prepared by precipitation from a solution of an aluminum salt by addition of an alkaline precipitating agent, with a heat decomposable salt of potassium in an amount sufficient to provide the finished catalyst with from about 0.025 to 0.5% by weight potassium oxide, calcining the resulting impregnated aluminum at temperatures above 1400° F. to reduce the surface area of the calcined product to between about 80 and 150 m.²/g., impregnating the calcined, potassium oxide-alumina product with a solution of a heat decomposable compound of chromium in an amount sufficient to provide the finished catalyst with from about 5 to 25% by weight chromium oxide, and calcining the chromium compound-containing product at temperatures above about 1400° F. to reduce the surface area of the catalyst to between about 30 and 80 m.²/g., the alkali metal oxide present on the finished catalyst being capable of being removed by leaching with hot water.

4. The method of claim 3 wherein the final calcining step brings the surface area of the catalyst into a range of from about 50 to 80 m.²/g.

References Cited in the file of this patent

UNITED STATES PATENTS

| 2,420,563 | Reynolds | May 13, 1947 |
| 2,474,440 | Smith | June 18, 1949 |
| 2,754,345 | Kirshenbaum | July 10, 1956 |
| 2,768,961 | Weck | Oct. 30, 1956 |